United States Patent Office 3,729,497
Patented Apr. 24, 1973

3,729,497
BARATE ESTERS PREPARED BY SUCCESSIVE REACTIONS OF BORIC ACID WITH GLYCOL MONOETHERS AND POLYOLS
Arthur W. Sawyer, 158 Earl Ave., Hamden, Conn., and David A. Csejka, 495 Derby-Milford Road, Orange, Conn.
No Drawing. Original application July 14, 1967, Ser. No. 653,337. Divided and this application Nov. 5, 1970, Ser. No. 87,306
Int. Cl. C07f 5/04
U.S. Cl. 260—462 R
3 Claims

ABSTRACT OF THE DISCLOSURE

Borate esters of the formula:

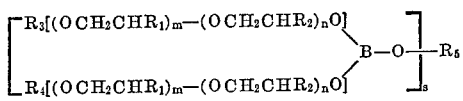

wherein $R_1$ and $R_2$ are hydrogen or methyl; $R_3$ and $R_4$ are each an independently selected alkyl group having from 1 to 20 carbon atoms; $R_5$ is the organic residue exclusive of reactive hydroxyl groups of a polyol of the formula:

wherein $s$ is an integer of from 2 to 3 inclusive, $z$ is an integer of from 1 to 10 inclusive, $R_7$ is selected from the group consisting of hydrogen and methyl and $R_8$ is selected from the group consisting of hydrogen and alkyl of from 1 to 4 carbon atoms, and $n$ and $m$ are positive integers independently selected in each chain and whose sum in each chain is from 2 to 20 are prepared by successively reacting boric acid with a glycol monoether and a polyol. These esters are useful as stabilizers and corrosion inhibitors for lubricants and non-aqueous hydraulic fluids.

---

This is a divisional application of Ser. No. 653,337, filed July 14, 1967 by Arthur W. Sawyer and David A. Csejka, now U.S. Pat. No. 3,637,794.

This invention relates to novel borate esters. In particular, this invention relates to novel borate esters of the general formula:

I 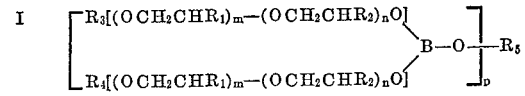

where $R_1$ and $R_2$ are independently selected from the group consisting of hydrogen or methyl; $R_3$ and $R_4$ are each an independently selected alkyl group having from 1 to 20 carbon atoms; $R_5$ is the organic residue exclusive of reactive hydroxyl groups of a polyol, $p$ is an integer of from 2 to 6 inclusive and $n$ and $m$ are positive integers independently selected in each chain and whose sum in each chain is from 2 to 20.

The novel borate esters of this invention are useful as desiccants for drying of gases and as stabilizers and corrosion inhibitors for lubricants and non-aqueous hydraulic fluids, such as those based on glycols, polyglycols, the alkylene oxide adducts of phenols and the dialkyl ethers of glycols and polyglycols.

The novel esters of this invention are stable at elevated temperatures and they possess very high boiling points. On hydrolysis these novel borate esters yield ultimately the glycol monoether, boric acid and the polyol employed in preparing these compounds.

The novel borates of this invention are also useful as ingredients in soldering of brazing fluxes. They also find use as compounding ingredients for natural and synthetic resins, since in addition to serving as plasticizers, they reduce the flammability of the material being plasticized.

In general, the novel compounds of this invention are prepared in two steps. In the first step, a stoichiometric amount of a boron-containing compound, such as orthoboric acid, is reacted with a glycol monoether or mixture of glycol monoethers to yield an intermediate borate compound (A). Secondly, the intermediate borate compound is reacted with a polyol having from 2 to 6 inclusive hydroxyl groups to obtain the novel borate compounds (B) of the present invention. The two reactions, namely the reaction of the first stage and the reaction of the second stage, proceed as shown in the following equations where for purposes of illustration a single glycol monoether is utilized in preparing compound (A):

I.
$$2R[(OCH_2CHR_1)_m—(OCH_2CHR_2)_n]OH + H_3BO_3$$

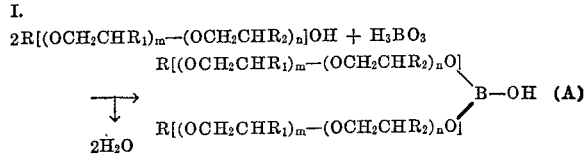

II.

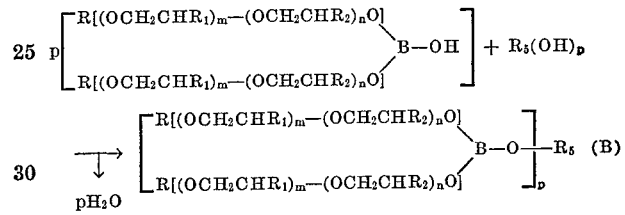

wherein $R_1$, $R_2$, $R_5$, $n$, $m$ and $p$ have the same meaning as previously described and R is alkyl of from 1 to 20 carbon atoms.

In the preferred method of preparation boric acid is employed as the boron-containing material and an inert water-azeotroping solvent is added to the reaction vessel along with the glycol monoether starting material. The water-azeotroping solvent is selected so that the azeotrope distils at a temperature below the boiling point of the monohydroxy compound. The temperature of the reaction mixture is initially maintained preferably between 0 and 200° C. and desirably at the distillation temperature of the water-solvent azeotrope. The use of a graduated Barrett receiver facilitates the measurement and separation of the water of condensation. Preferably, the reaction is conducted without an added catalyst to simplify the utilization of the product, although an esterification catalyst may be employed, if desired. When the water removed is equivalent to the stoichiometric requirement to yield the intermediate borate compound (A), the reaction mixture is cooled to a temperature below its reflux temperature and a stoichiometric amount of a polyol "bridging" compound is introduced into the reaction mixture. After stirring the mixture to ensure uniformity, it is again heated so that azeotropic removal of water is resumed. As soon as the removal of water is essentially completed, the solvent is then conveniently removed by distillation. The borate ester remaining after removal of the solvent can be further stripped under reduced pressure to remove any unreacted starting materials present. Other methods are known in the art for purifying the borate ester. For example, the ester can be recovered as the pure product by extraction with a suitable solvent followed by evaporation of the solvent.

Boron compounds which are suitable as starting materials for the preparation of the novel boron esters include orthoboric acid, metaboric acid, boric oxide, and the like. Orthoboric acid, metaboric acid and boric oxide are preferred because of their relatively low cost. Toluene and benzene are the preferred azeotrope-forming solvents;

however, other inert solvents may be utilized providing that they form azeotropes with water, such as, for example, xylene, ethylbenzene, mesitylene and the like.

Glycol monoethers suitable for use in the preparation of the novel borate esters of this invention include those of the formula:

$$R[(OCH_2CHR_1)_m—(OCH_2CHR_2)_n]OH$$

where $R_1$ and $R_2$ are independently selected from the group consisting of hydrogen and methyl, R is an alkyl group containing from 1 to 20 carbon atoms, and $m$ and $n$ are positive integers whose sum is from 2 to 20.

Many glycol monoethers are commercially available. Suitable glycol monoethers, for example, include:

(1) $CH_3(OCH_2CH_2)_2OH$
(2) $CH_3(OCH_2CH_2)_3OH$
(3) $CH_3(OCH_2CH_2)_{10}OH$
(4) $CH_3(OCH_2CHCH_3)_3(OCH_2CH_2)OH$
(5) $CH_3(OCH_2CH_2)_3(OCH_2CHCH_3)OH$
(6) $CH_3(OCH_2CH_2)_6(OCH_2CHCH_3)_{10}OH$
(7) $CH_3(OCHCH_3)_2(OCH_2CHCH_3)_2OH$
(8) $CH_3(OCH_2CHCH_3)_2OH$
(9) $CH_3(OCH_2CHCH_3)_{13}OH$
(10) $CH_3(OCH_2CHCH_3)_4OH$
(11) $C_2H_5(OCH_2CH_2)_2OH$
(12) $C_2H_5(OCH_2CH_2)_{13}OH$
(13) $C_2H_5(OCH_2CHCH_3)_4OH$
(14) $C_2H_5(OCH_2CHCH_3)_2(OCH_2CH_2)_2OH$
(15) $C_4H_9(OCH_2CH_2)_{12}OH$
(16) $C_4H_9(OCH_2CH_2)_9OH$
(17) $C_4H_9(OCH_2CH_2)_4OH$
(18) $C_4H_9(OCH_2CH_2)_3(OCH_2CHCH_3)_{10}OH$
(19) $C_4H_9(OCH_2CH_2)_3(OCH_2CHCH_3)_{12}OH$
(20) $C_5H_{11}(OCH_2CH_2)_3OH$
(21) $C_6H_{13}(OCH_2CH_2)_2(OCH_2CHCH_3)_2OH$
(22) $C_{10}H_{21}(OCH_2CH_2)_{14}OH$
(23) $C_{10}H_{21}(OCH_2CHCH_3)_3(OCH_2CH_2)OH$
(24) $C_{12}H_{25}(OCH_2CHCH_3)_4OH$
(25) $C_{15}H_{31}(OCH_2CHCH_3)_2(OCH_2CHCH_3)_2OH$
(26) $C_{20}H_{41}(OCH_2CHCH_3)_6OH$

Mixtures of the above-listed glycol monoethers can also be used.

Polyols suitable for use in connecting two or more of the intermediate borates of the formula:

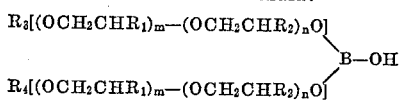

wherein $R_1$, $R_2$, $R_3$, $R_4$, $m$ and $n$ have the same meaning as previously described, include compounds of the formula:

$$R_5(OH)_p$$

wherein $p$ is an integer of from 2 to 6 inclusive and wherein $R_5$ is the organic residue exclusive of the reactive hydroxyl groups. Useful polyols include (1) glycols of the formula:

$$H(O—R_6)_r—OH$$

wherein $R_6$ is alkylene of from 2 to 10 carbon atoms and $r$ is an integer of from 1 to 10; (2) thioglycols selected from the group consisting of thiodiethylene glycol and thiodipropylene glycol; (3) amines of the formula:

$$[H(OCH_2CHR_7)_z]_sN(R_8)_{3-s}$$

wherein $s$ is an integer of from 2 to 3 inclusive, $z$ is an integer of from 1 to 10 inclusive, $R_7$ is selected from the group consisting of hydrogen and methyl and $R_8$ is selected from the group consisting of hydrogen and alkyl of from 1 to 4 carbon atoms and (4) polyols having from 3 to 6 inclusive hydroxyl groups. Where the polyol is an amine of group (3), supra, $p$ in Formula I becomes $s$.

Specific examples of the above-mentioned polyols include for example, ethylene glycol, propylene glycol, butylene glycol, isobutylene glycol, pentanediol, hexylene glycol, neopentyl glycol, diethylene glycol, tetraethylene glycol, hexaethylene glycol, decaethylene glycol, dipropylene glycol, triisopropylene glycol, tetrapropylene glycol, hexabutylene glycol, 2-ethyl-1,3-hexanediol, thiodiethylene glycol, thiotripropylene glycol, diethanolamine, dipropanolamine, triethanolamine, tributanolamine, methyl diethanolamine, ethyl diethanolamine, methyl dipropanolamine, ethyl dipropanolamine, methyl dibutanolamine, propyl dipropanolamine, butyl diethanolamine, glycerol, trimethylol propane, pentaerythritol, sorbitol, mannitol and 1,2,6-hexanetriol.

The novel borate esters of this invention can be utilized to prepare brake fluid having boiling points in excess of 490° F. In such brake fluid compositions these borates form the major component and are present in amounts of from about 55 to about 90 percent by weight of the final fluid. A typical hydraulic fluid composition utilizing the product of Example V, which has the formula:

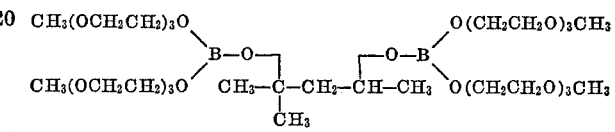

is given below:

|  | Percent by weight |
|---|---|
| Product of Example V | 75.0 |
| Triethylene glycol monomethyl ether | 7.5 |
| Diethanolamine | 2.0 |
| Polyethylene glycol (mol. wt. 200) | 15.0 |
| Sodium nitrite | 0.05 |

This formulation was tested in accordance with the appropriate methods of the SAE J70c for Hydraulic Brake Fluids and the following properties were observed:

| | |
|---|---|
| Reflux boiling point | 509° F. |
| Viscosity: | |
| At 212° F. | 2.7 cs. |
| At −40° F. | 3380 cs. |
| Cold Test: | |
| 6 days at −40° F. | Clear liquid. |
| 6 hours at 58° F. | Clear liquid. |
| Rubber swelling: | |
| Natural Rubber, 120 hours, 158° F. | 2.5 percent diameter. |
| Styrene-Butadiene, 70 hours, 248° F. | 4.2 percent diameter. |
| Water tolerance (3.5 percent vol. added water): | |
| 24 hours at −40° F. | Clear liquid. |
| 24 hours at 140° F. | Clear liquid. |

These values illustrate the highly superior properties of hydraulic fluids prepared with the novel borates of this invention. The addition of 3.5 percent volume of water to the above formulation yielded a fluid having a reflux boiling point of 368° F. according to the procedure of ASTM 1120-65, whereas typical currently commercial brake fluids with 3.5 percent added water have inferior properties (i.e., below 302° F.) when tested in the same manner.

The following examples illustrate specific embodiments of this invention and are to be considered not limitative:

EXAMPLE I

A total of 985 g. (6 moles) of $CH_3(OCH_2CH_2)_3OH$, 85.5 g. (3 moles) of orthoboric acid and 510 ml. of toluene were mixed together in a 2 liter, round-bottom, 3-neck flask equipped with a magnetic stirrer. With heating at reflux temperature and stirring, the water of condensation was removed as formed by azeotropic action. When 108 ml. (6 moles) of water had separated, the reaction mixture was allowed to cool below reflux temperature. Then 179 g. (1.5 moles) of 2-methyl-2,4-pentanediol was introduced and the reaction mixture was stirred and reheated to reflux temperature in order to resume azeotroping out the water of condensation. As soon as the water had been essentially all removed, the toluene was distilled off and the residue containing the product was stripped under water aspirator vacuum at 90 to 120° C. pot temperature for 1.5 hours—in order to remove unreacted products. A total of 1192 g. of product (essentially 100 percent of theory), a clear colorless liquid with a viscosity at —40° C. of approximately 1400 cs. and having the formula:

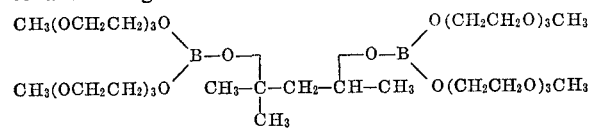

was obtained.

*Analysis.*—Calculated B, 2.72%. Found: B, 2.78%.

EXAMPLE II

In a manner similar to that in Example I, 242.7 g. (2 moles) of $CH_3(OCH_2CH_2)_2OH$, 61.85 g. (1 mole) orthoboric acid and 230 ml. toluene were mixed together and heated at reflux temperature until 36 ml. (2 moles) of water had been removed as the azeotrope. The reaction mixture was allowed to cool below reflux temperature and 53.6 g. (0.5 mole) of diethylene glycol was introduced, with continued stirring. The mixture was reheated to resume azeotroping action. When water separation essentially had ceased, the toluene was distilled off and the residue was stripped under full water aspirator vacuum at a pot temperature of 138 to 140° C. for 10 minutes to remove unreacted starting materials. Product in the amount of 291 g. (96 percent of the theoretical yield), a clear, light straw-colored liquid, was obtained. This product, which has the formula:

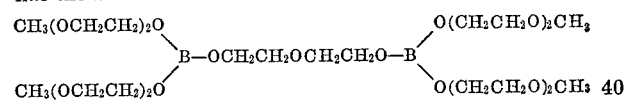

exhibited a viscosity at —40° C. of 3632 cs.

*Analysis.*—Calculated (percent): C, 47.86; H, 8.70; B, 3.59. Found (percent): C, 46,76, 46.49; H, 8.46, 8.70; B, 3.57, 3.60.

EXAMPLE III

In a manner similar to Example I, 324 g. (2 moles) of $CH_3(OCH_2CH_2)_3OH$, 61.8 g. (1 mole) of orthoboric acid and 265 ml. of toluene were mixed together and heated until a total of 36 ml. (2 moles) of water had been removed as the azeotrope. 45.4 g. (0.33 mole) of commercial trimethylol propane was introduced into the hot liquid. As soon as the solid trimethylol propane flakes had dissolved in the stirred reaction mixture, azeotropic removal of water was resumed. When separation of water had essentially ceased, the toluene was distilled off and the residue was stripped at 140 to 148° C. pot temperature under full water aspirator vacuum for approximately 10 minutes. A total of 375.4 g. (99.5 percent of theoretical yield) of a clear, colorless liquid having the formula:

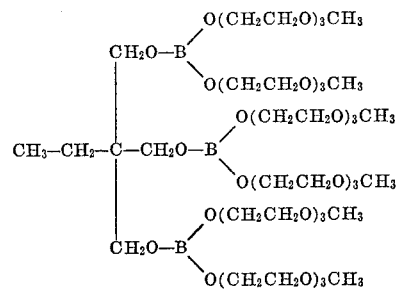

was obtained. The product exhibited a viscosity at —40° C. of 6161 cs.

*Analysis.*—Calculated: B, 2.88%. Found: B, 2.87%.

EXAMPLE IV

In a manner similar to the preceding examples, 324 g. (2 moles), of $CH_3(OCH_2CH_2)_3OH$, 61.8 g. (1 mole) of boric acid and 275 ml. of toluene were mixed together and heated with continuous stirring until 36 ml. of water had been removed as the azeotrope. Then 30.4 g. (0.17 mole) of sorbitol was introduced and azeotroping was continued until separation of water had essentially ceased. After the toluene had been distilled off, the residue was stripped under full water aspirator vacuum at a pot temperature of 145 to 155° C. for approximately 10 minutes to remove unreacted starting materials. A total of 360 g. of product (97 percent of theory), a clear, colorless liquid, having the formula:

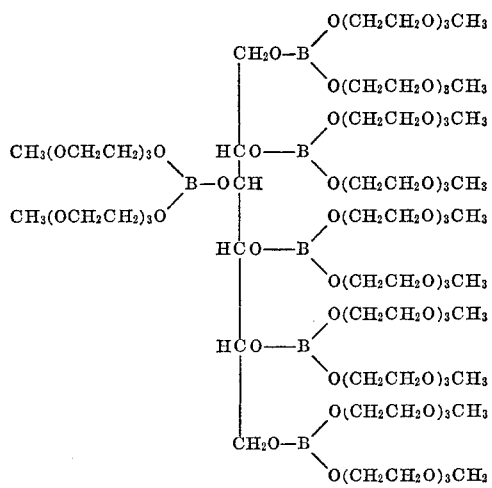

was obtained. The viscosity of the product at —40° C. was 11,827 cs.

*Analysis.*—Calculated: B, 3.00%. Found: B, 2.92%.

EXAMPLE V

In a manner similar to Example I, 641.3 g. of commercial (99 percent) $CH_3(OCH_2CH_2)_2OH$, 164.9 g. orthoboric acid and 200 ml. of toluene were mixed together and heated. Simultaneously, the water of condensation formed was removed overhead as the water-toluene azeotrope. After essentially 5.33 moles of water had been removed, the reaction mixture was allowed to cool below reflux temperature following which 82.7 g. of 99 percent glycerine was added. Azeotropic removal of water was resumed. As soon as the water separation had essentially ceased, the toluene was removed by distillation and the remaining reaction mixture stripped under full aspirator vacuum at a pot temperature of 145 to 150° C. for 15 minutes to remove unreacted starting materials. Borate ester in the amount of 734 g. (98.5 percent of the theoretical yield), a clear, light straw-colored liquid, having the formula:

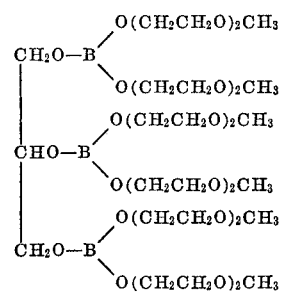

was obtained.

*Analysis.*—Calculated: B, 3.88%. Found: B, 4.17%.

EXAMPLE VI

In a manner similar to Example III, a lower homolog, specifically $CH_3[OCH_2CH_2]_2OH$ was substituted, using the same molar ratios of other reactants as were used in Example III, to yield a clear, light-colored product (96 percent of theoretical) having a formula:

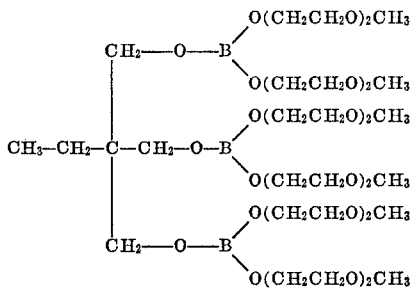

The product was fluid at —40° C.; viscosity at —40° C.=2627 cs.

*Analysis.*—Calculated: B, 3.57%. Found: B, 3.87%.

EXAMPLE VII

Example I was repeated using a lower homolog, specifically $CH_3(OCH_2CH_2)_2OH$, with the same molar ratios of other reactants, to yield a clear colorless liquid product (97 percent of theory) having the following formula:

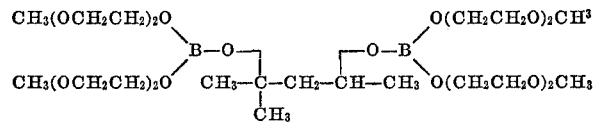

The viscosity of the product at minus 40° C. was approximately 450 cs.

*Analysis.*—Calculated: B, 3.52%. Found: B, 3.66%.

EXAMPLE VIII

In a manner similar to preceding examples, 324 g. (2 moles) of $CH_3(OCH_2CH_2)_3OH$, 61.8 g. (1 mole) orthoboric acid and 250 ml. of toluene were mixed together and heated with continuous stirring until 36.5 ml. of water was removed as the azeotrope. Then 34.4 g. (0.25 mole) of pentaerythritol was introduced and stirred until it dissolved. Azeotropic removal of water was continued and an additional 17 ml. of water was removed and recovered. The mixture was then stripped under full water aspirator vacuum while heating to 154° C. pot temperature to remove the toluene and any unreacted starting materials. A total of 364.5 g. of product (99.5 percent of theoretical) an essentially clear colorless liquid with a viscosity at —40° C. of 9117 cs., having the formula:

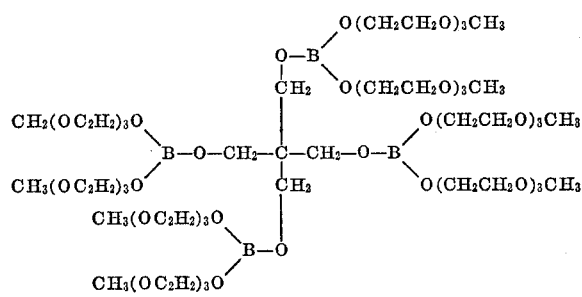

was obtained.

*Analysis.*—Calculated: B, 2.92%. Found: B, 2.96%.

EXAMPLE IX

In a manner similar to the preceding examples, 247.7 g. (2 moles) of commercial $CH_3(OCH_2CH_2)_2OH$, 61.84 g. (1 mole) boric acid and 220 ml. toluene were mixed together and heated with continuous stirring until 36 ml. of water had been removed as the azeotrope. Then 61.9 g. (0.5 mole) of commercial thiodiethylene glycol was introduced. Azeotropic removal of water was continued until separation of water had essentially ceased. After stripping the product under full water aspirator vacuum to a pot temperature of 159° C., to remove toluene and unreacted volatile materials, 298.5 g. (96.8 percent of theoretical) of clear yellow-brown liquid product was obtained. The product which exhibited a viscosity at —40° C. of 5200 cs., has the formula:

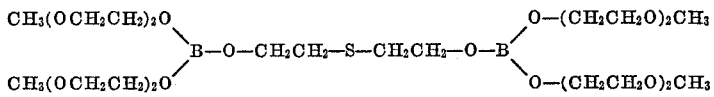

*Analysis.*—Calculated (percent): C, 46.62; H, 8.48; B, 3.50; S, 5.19. Found (percent): C, 45.97, 46.06; H, 8.17, 8.36; B, 3.36; S, 5.19, 5.31.

EXAMPLE X

In a manner similar to Example IX, 2 moles of $$CH_3(OCH_2CH_2)_2OH,$$

1 mole of orthoboric acid and 220 ml. of toluene were mixed together and heated with stirring until 36 ml. of water had been separated. Next 54.65 g. (0.5 mole) of diethanolamine was introduced and azeotropic removal of water was continued overnight. The reaction mixture was stripped under full water aspirator vacuum, with stirring and heating to a pot temperature of 143° C. to remove all toluene and unreacted volatile starting materials. The resultant product, which weighed 281 g. (93 percent of theoretical), was a clear, light-brown liquid with a viscosity at —40° C. of approximately 15,500 cs. and having the following formula:

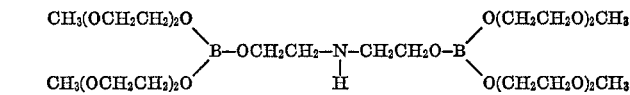

*Analysis.*—Calculated (percent): C, 47.9; H, 8.87; B, 3.60; N, 2.33. Found (percent): C, 46.92, 46.96; H, 8.77, 8.54; B, 3.62; N, 2.55, 2.65.

EXAMPLE XI

In a manner similar to Example IX, 2 moles of $$CH_3(OCH_2CH_2)_2OH,$$

1 mole of orthoboric acid and 220 ml. toluene were mixed together and heated with stirring until 36 ml. of water had been separated. Next 61.77 g. (0.5 mole) of methyl diethanolamine was introduced and azeotropic removal of water was continued overnight. The reaction mixture was then stripped under full water aspirator vacuum, with stirring and heating to a pot temperature of 140° C. There was obtained 301 g. of product (98 percent of theoretical), a clear, brown liquid with a viscosity at —40° C. of 1783 cs. and having the formula:

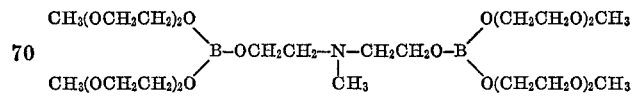

*Analysis.*—Calculated (percent): C, 48.79; H, 9.01; B, 3.52; N, 2.28. Found (percent): C, 47.04, 46.71; H, 8.71, 8.80; B, 3.35; N, 2.49, 2.61.

EXAMPLE XII

A total of 592 g. (4 moles) of $$CH_3(OCHCH_3CH_2)_2OH,$$

123.7 g. (2 moles) of orthoboric acid and 325 ml. toluene were mixed and heated together while simultaneously 72 ml. of water was removed as the azeotrope. Then 118.2 g. (1 mole) of 2-methyl-2,4-pentanediol was introduced and the azeotropic removal of water was continued overnight, at which time the separation of water essentially had ceased. The reaction mixture was stripped under full water aspirator vacuum while heating to a pot temperature of 140° C. to remove the toluene and any unreacted volatile starting materials. Product was recovered in the amount of 704 g. (97 percent of theoretical), a clear, yellow liquid having the formula:

$$\begin{array}{c}CH_3(OCH_2CHCH_3)_2O\\CH_3(OCH_2CHCH_3)_2O\end{array}\!\!\!\!>\!\!B\!-\!O\!-\!\underset{\underset{CH_3}{|}}{\overset{CH_3}{\overset{|}{C}}}\!-\!CH_2\!-\!\underset{}{\overset{}{C}H}\!-\!CH_3\;O\!-\!B\!<\!\!\!\!\begin{array}{c}O(CH_3CHCH_3O)_2CH_3\\O(CH_3CHCH_2O)_2CH_3\end{array}$$

The product was a clear liquid at −40° C.

*Analysis.*—Calculated: B, 2.98%. Found: B, 3.10%.

EXAMPLE XIII

A sample of commercial butoxy ethoxy propanol was distilled, discarding approximately 10 percent forecut and approximately 20 percent tail cut. 177 g. (1 mole) of the main (center) cut of colorless butoxy ethoxy propanol, 30.9 g. (0.5 mole) of boric acid and 200 ml. of toluene were mixed and heated together, in a manner similar to the preceding examples, to remove 18 ml. (1 mole) of water. Then 30 g. (0.25 mole) of 2-methyl-2,4-pentanediol was introduced and azeotropic removal of water was resumed and continued essentially to cessation. The product was then stripped to a pot temperature at 172° C. under full water aspirator vacuum to yield 208.3 g. (97 percent theory) of a clear, colorless liquid product having the formula:

$$\begin{array}{c}C_4H_9(OCH_2CH_2OCH_2CHCH_3)O\\C_4H_9(OCH_2CH_2OCH_2CHCH_3)O\end{array}\!\!\!\!>\!\!B\!-\!O\!-\!\underset{\underset{CH_3}{|}}{\overset{CH_3}{\overset{|}{C}}}\!-\!CH_2\!-\!CH\!-\!CH_3\;O\!-\!B\!<\!\!\!\!\begin{array}{c}O(CH_3CHCH_2OCH_2CH_2O)C_4H_9\\O(CH_3CHCH_2OCH_2CH_2O)C_4H_9\end{array}$$

At −40° C. the product was a clear liquid.

*Analysis.*—Calculated: B, 2.50%. Found: B, 2.61%.

EXAMPLE XIV

A mixture of homologous polyethylene glycol monomethyl ethers with an average molecular weight of 186 (calculated from determined hydroxyl number of 301) was employed as a reactant in this experiment. The lowest molecular weight component of this mixture was triethylene glycol monomethyl ether and the average formula of the mixture was:

$$CH_3(OCH_2CH_2)_{3.5}OH$$

784 g. (4 moles) of this mixture and 123.7 g. (2 moles) of USP boric acid were reacted in toluene, in the manner of previous examples, until 72 ml. (4 moles) of water had been removed as the azeotrope. Then 119 g. (1 mole) of hexylene glycol was introduced and azeotropic removal of water was resumed and continued essentially to cessation. Stripping under vacuum to 163° C. pot temperature in the manner of other examples, yielded 914 g. (99.5 percent of theoretical) of a clear, light-yellow product having the formula:

$$\begin{array}{c}CH_3(OCH_2CH_2)_{3.5}O\\CH_3(OCH_2CH_2)_{3.5}O\end{array}\!\!\!\!>\!\!B\!-\!O\!-\!\underset{\underset{CH_3}{|}}{\overset{CH_3}{\overset{|}{C}}}\!-\!CH_2\!-\!CH\!-\!CH_3\;O\!-\!B\!<\!\!\!\!\begin{array}{c}O(CH_2CH_2O)_{3.5}CH_3\\O(CH_2CH_2O)_{3.5}CH_3\end{array}$$

At −40° C. the product was a clear liquid.

*Analysis.*—Calculated (percent): C, 52.0; H, 8.19; B, 2.36. Found (percent): C, 51.45, 51.78; H, 8.96, 9.09; B, 2.39.

EXAMPLE XV

In a manner similar to the preceding examples, 324 g. (2 moles) of $CH_3(OCH_2CH_2)_3OH$, 61.8 g. (1 mole) of orthoboric acid and 250 ml. of toluene were mixed and heated together until 36 ml. (2 moles) of water was separated as the azeotrope. A total of 54.2 g. (0.5 mole) of 2,2 - dimethyl - 1,3 - propanediol was then introduced. Azeotropic removal of water was resumed and continued until water removal essentially ceased. The product was stripped to a pot temperature of 165° C. under vacuum as in the previous examples. Product in the amount of 374 g. (97 percent of theoretical), a clear colorless liquid product having a viscosity of 1605 cs. at −40° C. and having the formula:

$$\begin{array}{c}CH_3(OCH_2CH_2)_3O\\CH_3(OCH_2CH_2)_3O\end{array}\!\!\!\!>\!\!B\!-\!OCH_2C(CH_3)_2CH_2O\!-\!B\!<\!\!\!\!\begin{array}{c}O(CH_2CH_2O)_3CH_3\\O(CH_2CH_2O)_3CH_3\end{array}$$

was recovered.

*Analysis.*—Calculated: B, 2.79%. Found: B, 2.82%.

EXAMPLE XVI

Commercial isodecanol was oxypropylated by conventional techniques by charging isodecanol and an alkaline catalyst to a pressure reactor and then introducing propylene oxide under conditions which yielded a clear colorless liquid. This oxypropylated product was found to have a hydroxyl number of 123, a calculated average molecular weight of 456 and the average formula to be:

$$C_{10}H_{21}(OCH_2CHCH_3)_{5.1}OH$$

In a manner similar to previous examples, 456 g. (1 mole) of above oxypropylated product, 30.9 g. (0.5 mole) of orthoboric acid and 200 ml. of toluene were mixed and heated together until 18 ml. (1 mole) of water had been recovered as the azeotrope. 29.6 g. (0.25 mole) of 2-methyl-2,4-pentanediol was then introduced. Azeotroping was resumed and continued overnight at which time water separation had essentially ceased. The product was stripped to a pot temperature of 138° C. under vacuum as in previous examples. A total of 490 g. of a colorless, liquid product (essentially 100 percent of theory), a clear, viscous liquid at −40° C., having the formula:

$$\begin{array}{c}C_{10}H_{21}(OCH_2CHCH_3)_{5.1}O\\C_{10}H_{21}(OCH_2CHCH_3)_{5.1}O\end{array}\!\!\!\!>\!\!B\!-\!O\!-\!\underset{\underset{CH_3}{|}}{\overset{CH_3}{\overset{|}{C}}}\!-\!CH_2\!-\!CH\!-\!CH_3\;O\!-\!B\!<\!\!\!\!\begin{array}{c}O(CH_3CHCH_2)_{5.1}C_{10}H_{21}\\O(CH_3CHCH_2)_{5.1}C_{10}H_{21}\end{array}$$

was obtained.

*Analysis.*—Calculated: B, 1.10%. Found: B, 1.11%.

Many other brake fluid compositions which utilize the novel borate esters of this invention are described in Arthur W. Sawyer and David A. Csejka application for Water-Insensitive Hydraulic Fluids Containing Bis-Borate Esters or Bridged-Borate Esters, application Ser. No. 653,335, filed July 14, 1967, now abandoned, which application is incorporated in its entirety herein.

What is claimed is:

1. A borate ester of the formula:

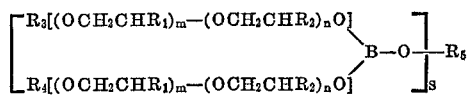

where $R_1$ and $R_2$ are independently selected from the group consisting of hydrogen and methyl; $R_3$ and $R_4$ are each an independently selected alkyl group having from 1 to 20 carbon atoms; $R_5$ is the organic residue exclusive of hydroxyl groups of a polyol of the formula:

wherein $s$ is an integer of from 2 to 3 inclusive, $z$ is an integer of from 1 to 10 inclusive, $R_7$ is selected from the group consisting of hydrogen and methyl and $R_8$ is selected from the group consisting of hydrogen and alkyl of from 1 to 4 carbon atoms.

2. A borate ester of claim 1 having the formula:

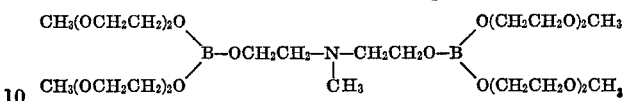

3. A borate ester of claim 1 having the formula:

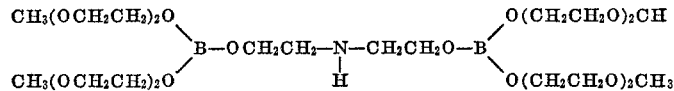

References Cited

UNITED STATES PATENTS

| | | | |
|---|---|---|---|
| 3,000,925 | 9/1961 | Rudner et al. | 260—462 R |
| 3,380,963 | 4/1968 | Thomas | 260—462 R |
| 3,428,469 | 2/1969 | Cyba | 260—462 R X |

LEON ZITVER, Primary Examiner

L. B. DE CRESCENTE, Assistant Examiner

UNITED STATES PATENT OFFICE
CERTIFICATE OF CORRECTION

Patent No. 3,729,497     Dated April 24, 1973

Inventor(s) Arthur W. Sawyer and David A. Csejka

It is certified that error appears in the above-identified patent and that said Letters Patent are hereby corrected as shown below:

Insert in the heading after the addresses of Patentees that assignee is Olin Mathieson Chemical Corporation.

In the title, "BARATE" should read --BORATE--.

Col. 3, line 19, "$CH_3(OCH_2CH_2)_3(OCH_2CHCH_3)OH$" should read --$CH_3(OCH_2CH_2)_8(OCH_2CHCH_3)OH$--.

Col. 3, line 33, "$C_4H_9(OCH_2CH_2)_3(OCH_2CHCH_3)_{12}OH$" should read --$C_4H_9(OCH_2CH_2)_8(OCH_2CHCH_3)_{12}OH$--

Col. 4, line 67, "85.5" should read --185.5--.

Col. 5, line 43, "C, 46,76" should read --C, 46.76--.

Col. 6, line 35, the lower portion of the formula reading

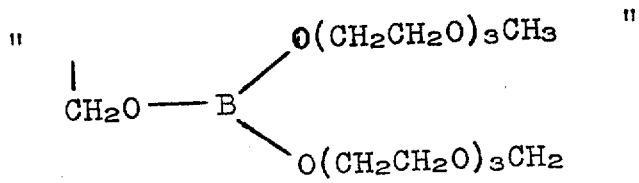

should read

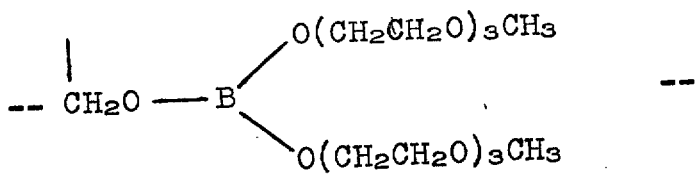

U.S. Patent No. 3,729,497
Issued April 24, 1973
Page 2

Col. 7, line 35 that portion of the formula reading

" B$\diagup^{O(CH_2CH_2O)_2CH^3}$ " should read -- B$\diagup^{O(CH_2CH_2O)_2CH_3}$ --

Col. 7, line 65, that portion of the formula reading

" CH$_2$(OC$_2$H$_2$)$_3$O$\diagdown_B$ " should read -- CH$_3$(OC$_2$H$_2$)$_3$O$\diagdown_B$ --

Col. 8, line 2, "247.7" should read --242.7--.

Col. 9, line 17, that portion of the formula reading

" O—B$\diagup^{O(CH_3CHCH_3O)_2CH_3}$ " should read --O—B$\diagup^{O(CH_3CHCH_2O)_2CH}$ --

Col. 12, line 12, that portion of the formula reading

" B$\diagup^{O(CH_2CH_2O)_2CH}$ " should read -- B$\diagup^{O(CH_2CH_2O)_2CH_3}$ --

Signed and sealed this 25th day of December 1973.

(SEAL)
Attest:

EDWARD M. FLETCHER, JR.
Attesting Officer

RENE D. TEGTMEYER
Acting Commissioner of Patents